(12) United States Patent
Caron

(10) Patent No.: US 11,312,283 B2
(45) Date of Patent: Apr. 26, 2022

(54) MOBILE PLATFORM FOR A VEHICLE BAGGAGE COMPARTMENT

(71) Applicant: François Caron, Brossard (CA)

(72) Inventor: François Caron, Brossard (CA)

(*) Notice: Subject to any disclaimer, the term of this patent is extended or adjusted under 35 U.S.C. 154(b) by 0 days.

(21) Appl. No.: 17/309,020

(22) PCT Filed: Oct. 15, 2019

(86) PCT No.: PCT/CA2019/051457
§ 371 (c)(1),
(2) Date: Apr. 14, 2021

(87) PCT Pub. No.: WO2020/077444
PCT Pub. Date: Apr. 23, 2020

(65) Prior Publication Data
US 2021/0316651 A1    Oct. 14, 2021

Related U.S. Application Data

(60) Provisional application No. 62/745,514, filed on Oct. 15, 2018.

(51) Int. Cl.
*B60P 1/00*    (2006.01)
*B60R 5/00*    (2006.01)

(52) U.S. Cl.
CPC . *B60P 1/00* (2013.01); *B60R 5/00* (2013.01)

(58) Field of Classification Search
CPC .. B60R 7/02; B60R 11/00; B60R 5/04; B60R 7/04; B60R 7/06; B60R 11/06; B60R 2011/0075; B60R 5/041; B60R 19/48; B60P 3/32; B60P 3/36; B60P 3/064; B60P 3/07; B60P 3/14; B60P 7/06; B60P 7/0807; B60P 7/0815; B60P 7/0876
USPC ........ 296/37.1, 37.12, 37.8, 69, 51, 56, 102, 296/198, 168; 224/401, 282, 539, 542, 224/275, 413, 427, 224, 483
See application file for complete search history.

(56) References Cited

U.S. PATENT DOCUMENTS 4,824,158 A * 4/1989 Peters ...................... B60R 5/04
                                                         108/44
5,064,335 A * 11/1991 Bergeron ................ B60P 1/003
                                                        414/522

(Continued)

OTHER PUBLICATIONS

International Search Report, PCT/CA2019/051457, dated Dec. 27, 2019.

*Primary Examiner* — D Glenn Dayoan
*Assistant Examiner* — Sunsurraye Westbrook
(74) *Attorney, Agent, or Firm* — Lavery, De Billy, LLP; Gwendoline Bruneau

(57) ABSTRACT

A platform and a wheel assembly, wherein the wheel assembly comprises one of: i) at least one supporting plate on each side of the platform, facing lateral edges of the platform, the supporting plate mounting a least a bottom rotating wheel at a first height of the plate and a top rotating wheel at a second height of the plate, the second height being higher that said first height, an interspace between facing rotating circumferential surfaces of said wheels engaging a respective lateral edge of the platform; a rotation axis of the wheels being mounted on said plate with a controlled positional tolerance; and ii) at least one wheel mounted on lateral edges of the platform, a rotation axis of the wheels being mounted on the platform with a controlled positional tolerance.

20 Claims, 20 Drawing Sheets

(56) References Cited

U.S. PATENT DOCUMENTS

| | | | |
|---|---|---|---|
| 5,090,335 A * | 2/1992 | Russell | B60P 1/433 |
| | | | 108/44 |
| 5,944,371 A | 8/1999 | Steiner et al. | |
| 5,988,722 A * | 11/1999 | Parri | B60P 1/003 |
| | | | 224/403 |
| 6,149,040 A * | 11/2000 | Walker | B60R 7/02 |
| | | | 224/404 |
| 6,328,364 B1 | 12/2001 | Darbishire | |
| 6,398,283 B1 * | 6/2002 | Knudtson | B60P 1/003 |
| | | | 296/26.09 |
| 6,712,415 B1 | 3/2004 | Darbishire et al. | |
| 2018/0009360 A1 * | 1/2018 | Christian | B66F 7/16 |

* cited by examiner

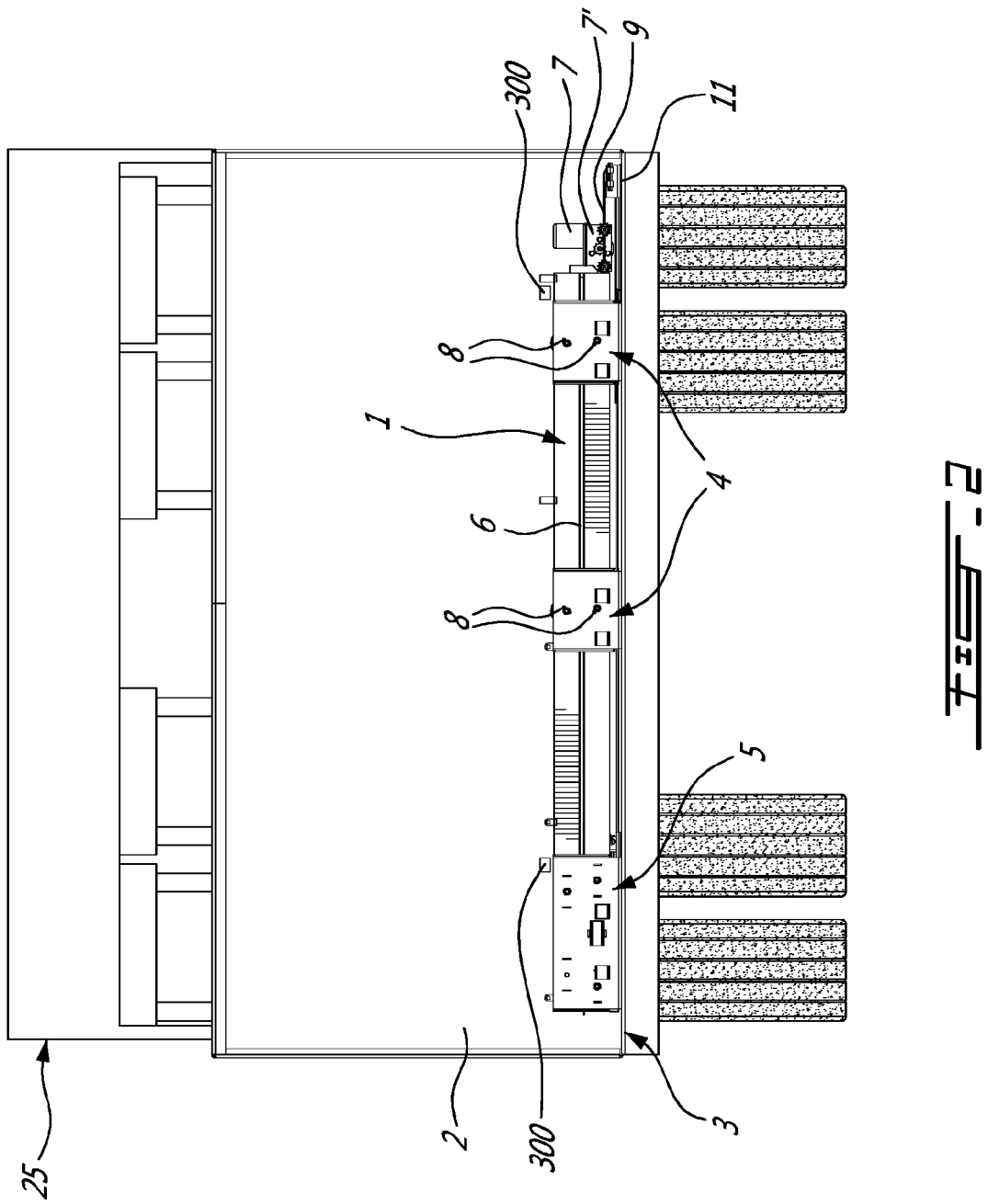

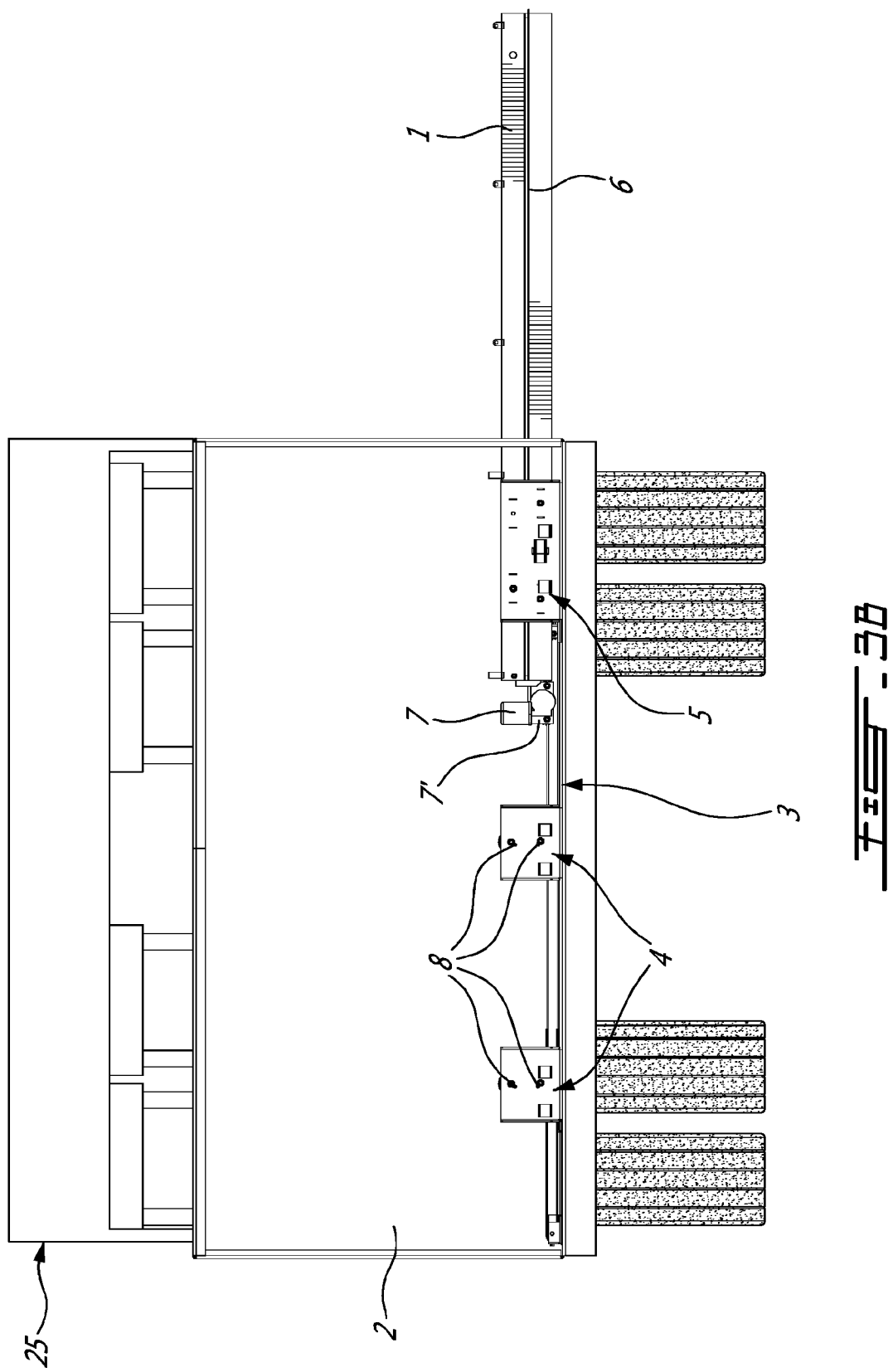

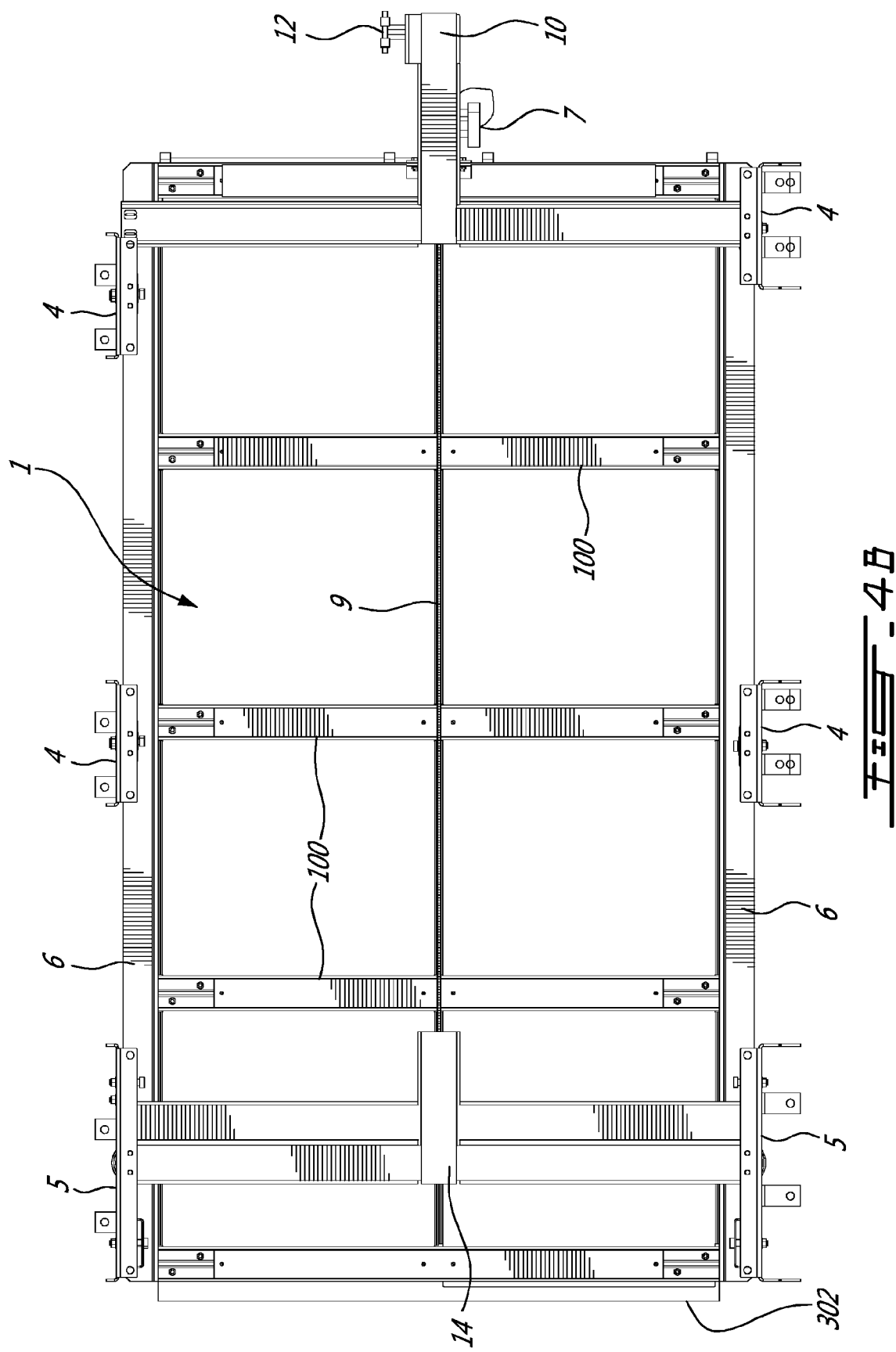

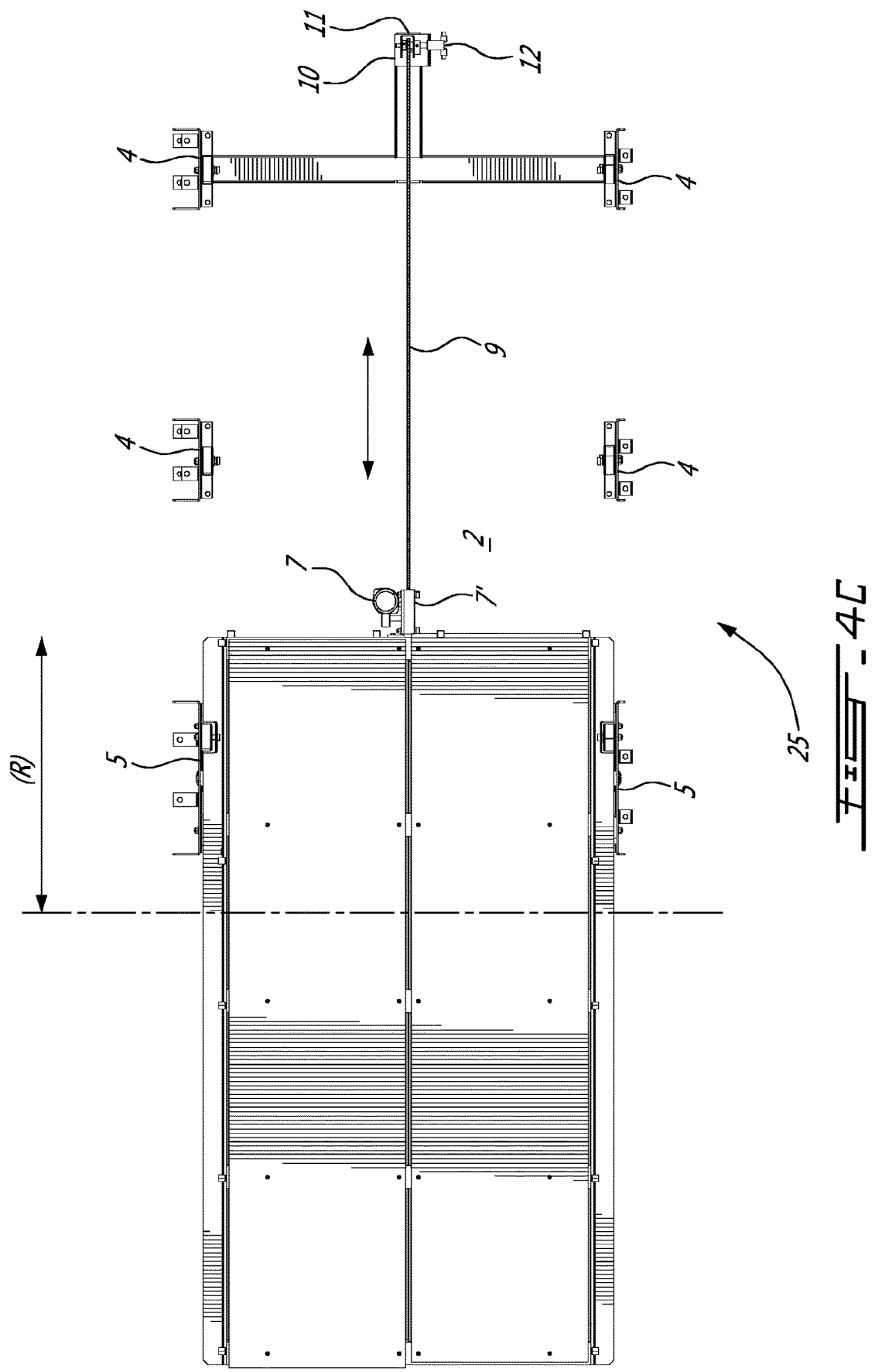

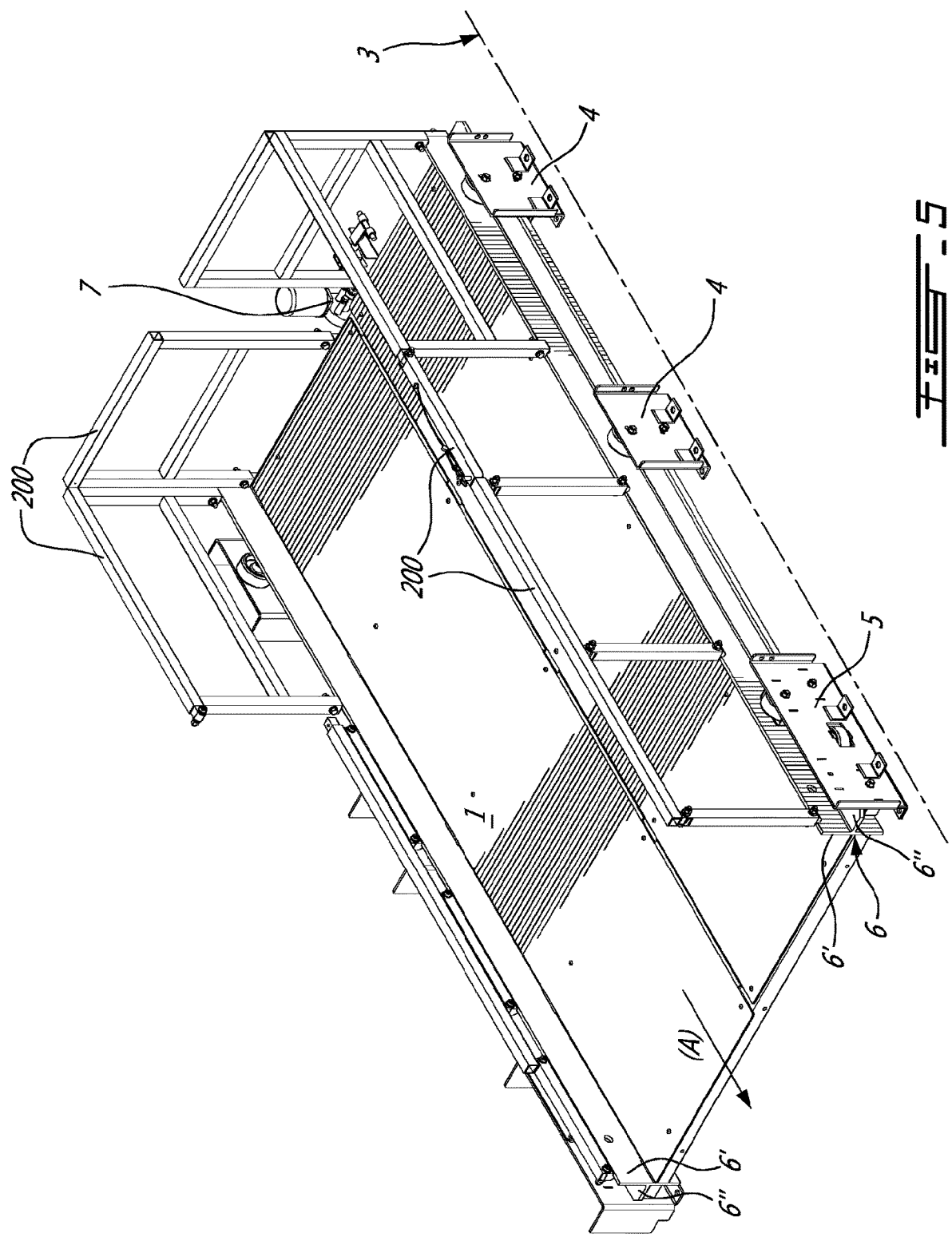

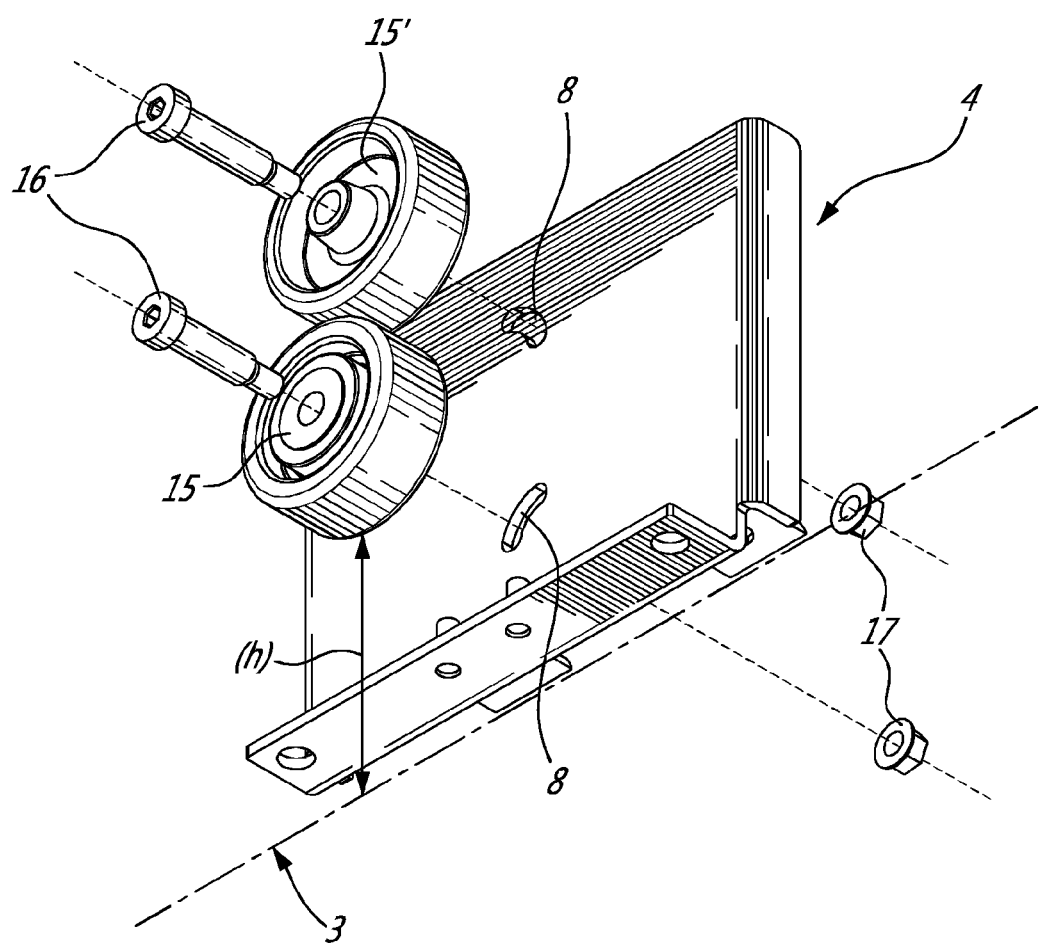

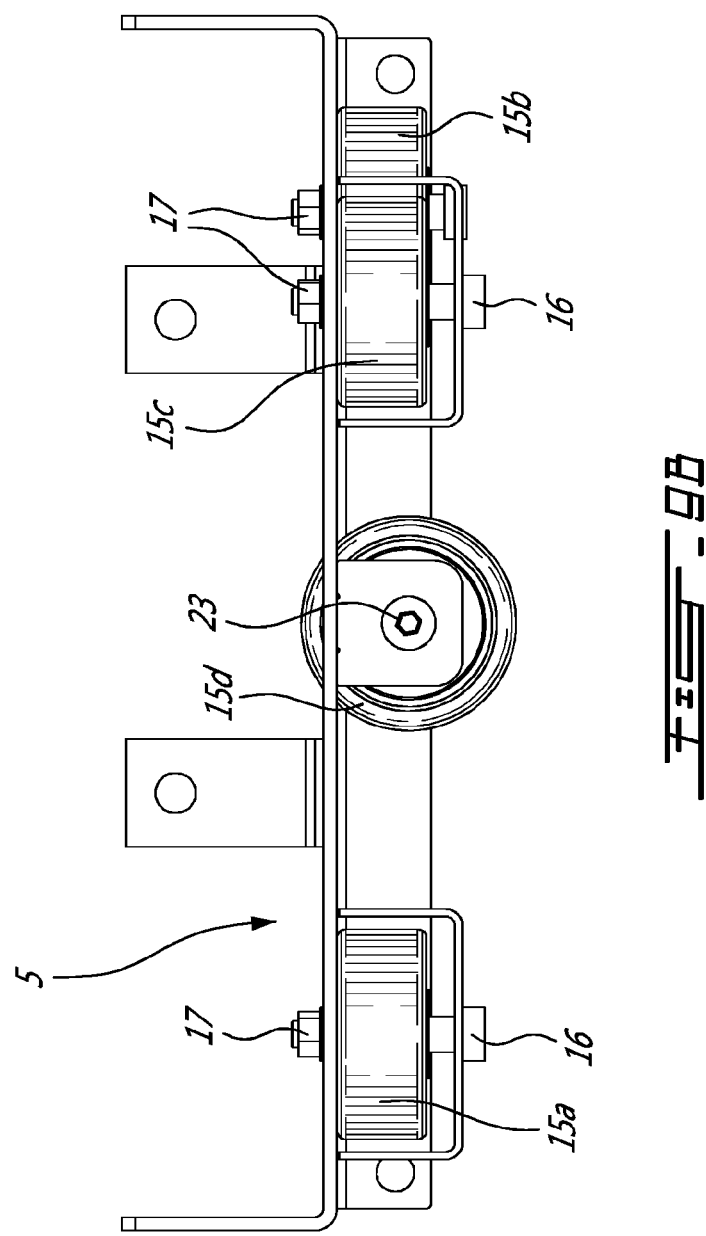

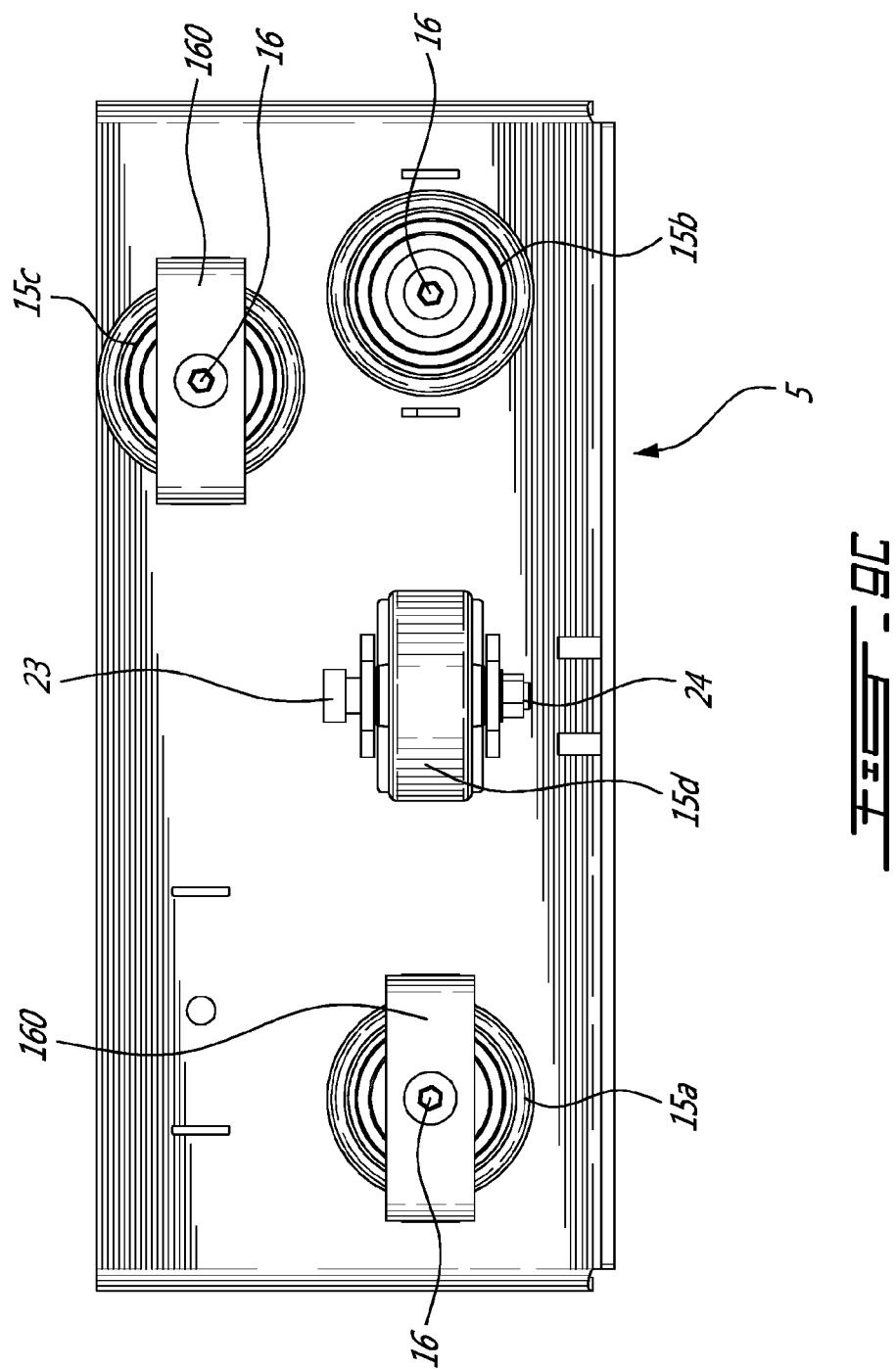

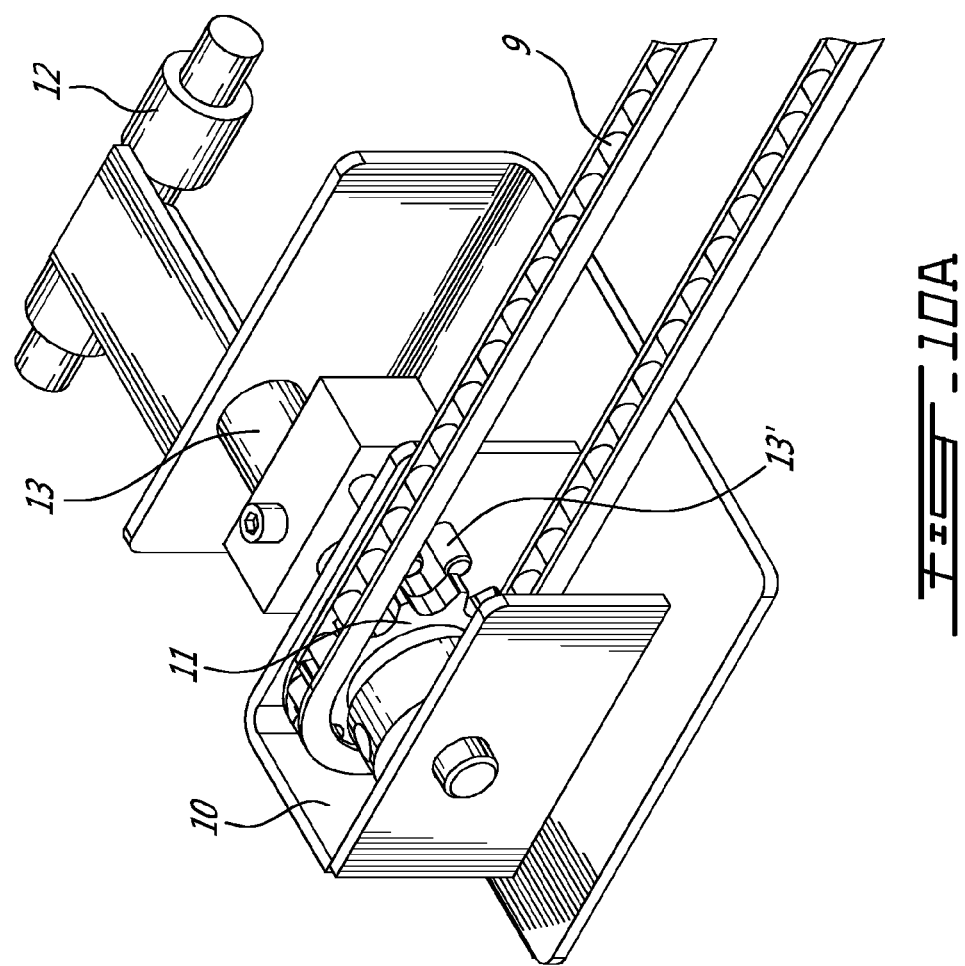

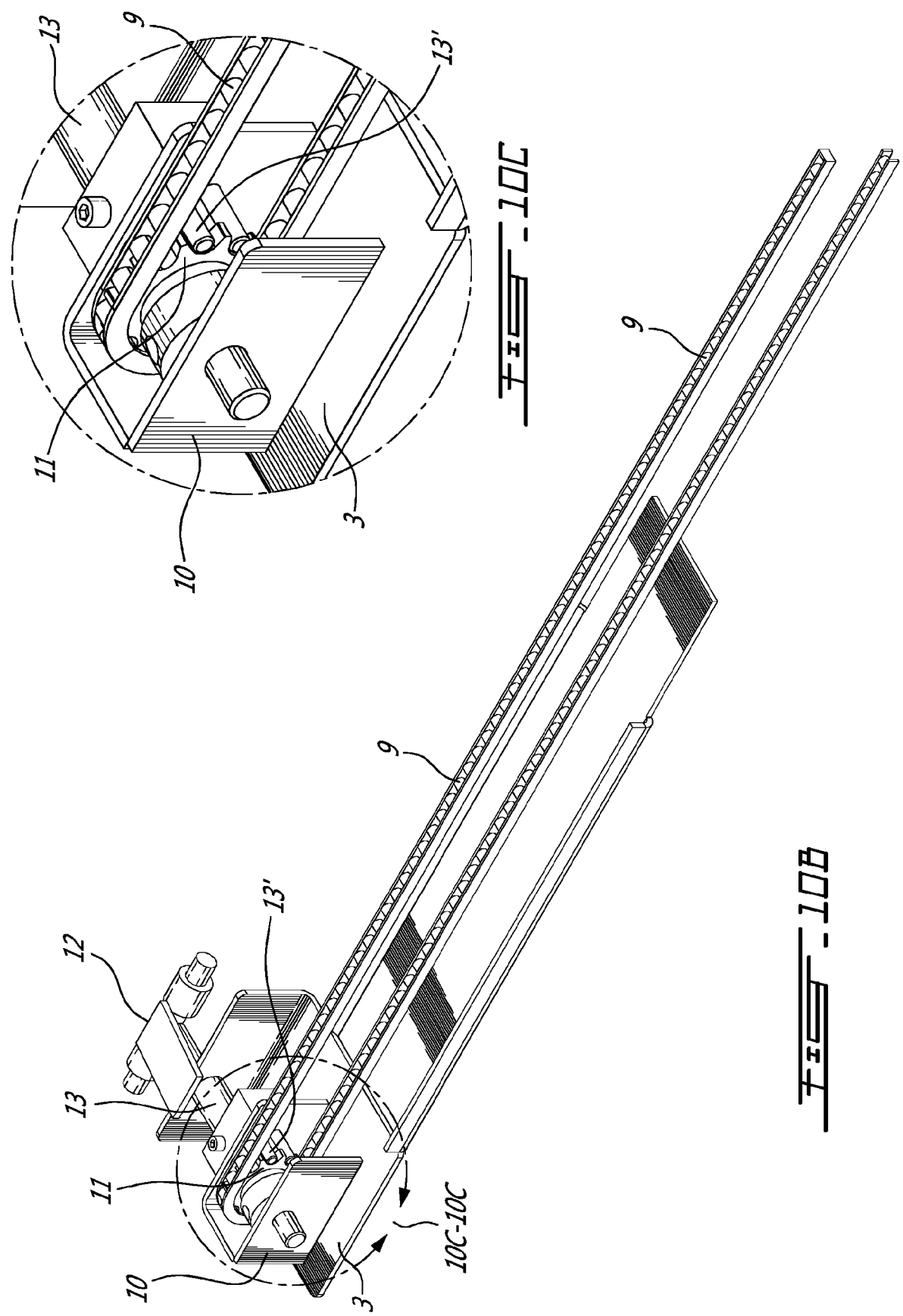

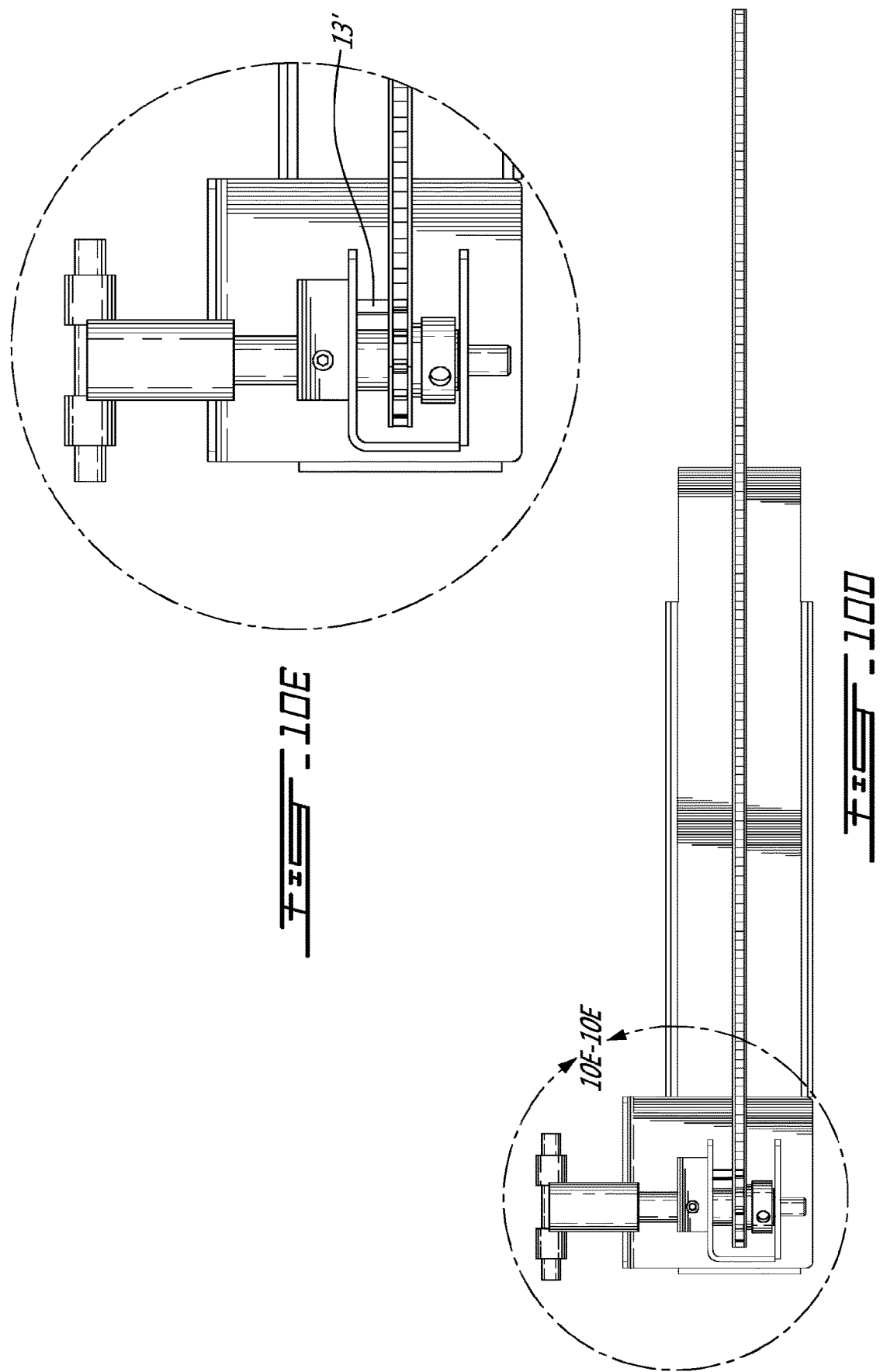

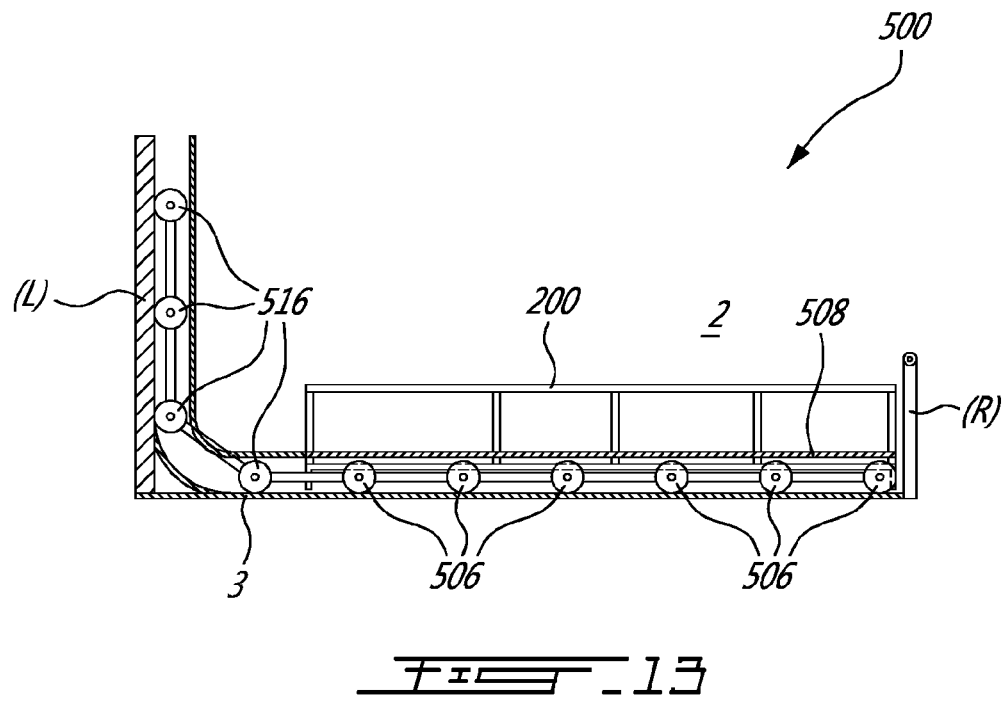
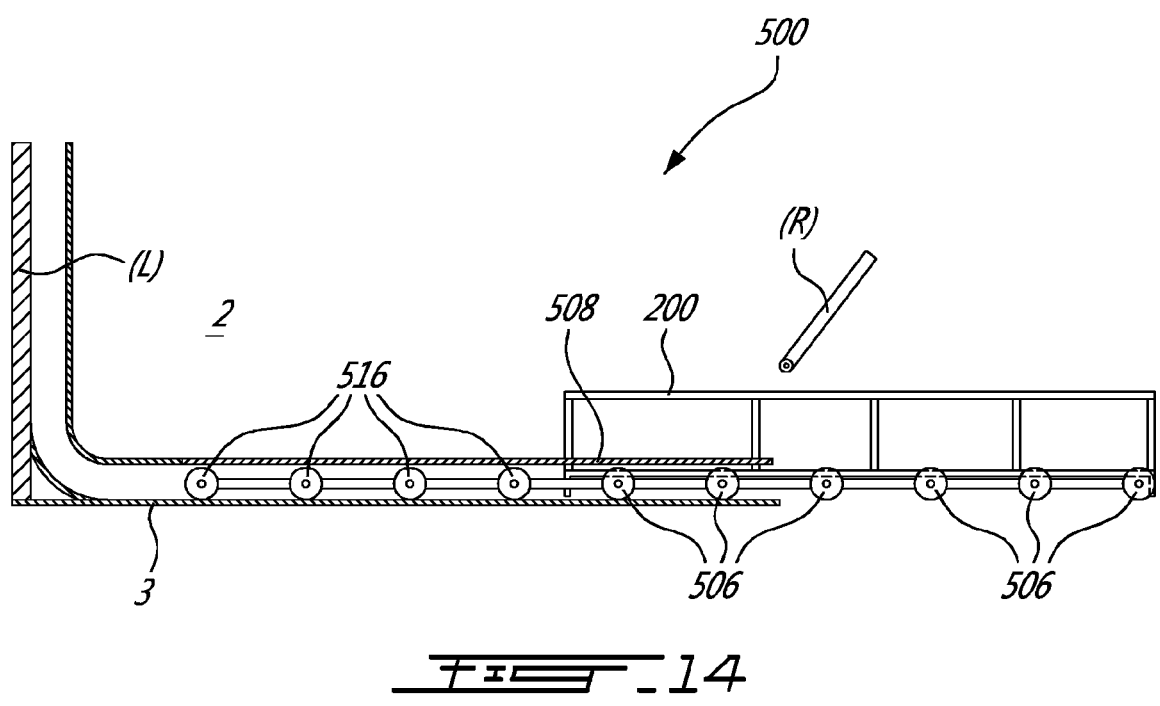

MOBILE PLATFORM FOR A VEHICLE BAGGAGE COMPARTMENT

CROSS-REFERENCE TO RELATED APPLICATIONS

This application is a is a National Entry Application of PCT application no PCT/CA2019/051457 filed on Oct. 15, 2019 and published in English under PCT Article 21(2), which itself claims benefit of U.S. provisional application Serial No. 62/745,514, filed on Oct. 15, 2018. All documents above are incorporated herein in their entirety by reference.

FIELD OF THE INVENTION

The present invention relates to a vehicle baggage compartment. More specifically, the present invention is concerned with a mobile platform system and method for a vehicle baggage compartment.

BACKGROUND OF THE INVENTION

In vehicles such as passenger buses or coaches for example, large bags, suitcases, packages and other oversize pieces of baggage of all kinds are typically stored in a baggage compartment of the vehicles.

Such baggage compartment is usually located in a lower part of the vehicle, below the passenger cabin, spanning part or most of the width thereof from a first lateral side thereof to an opposite lateral side thereby providing high capacity storage. As shown for example in FIG. 1, access doors (D) on either lateral sides of the vehicle (V) allow access to the content of such baggage compartments.

Loading items into and unloading items from such baggage compartments may be an issue, especially in cases of items positioned away from the access doors, typically in the middle of the baggage compartment further from the access doors as items stored closer to the access doors may prevent access thereto. Drivers typically have to perform this task of loading and unloading such content in and out of the baggage compartment, stepping in and out of the baggage compartment several times per day. This task is physically difficult, strenuous and may cause injury.

There is still a need in the art for a system and a method for a mobile platform for a vehicle baggage compartment.

SUMMARY OF THE INVENTION

More specifically, in accordance with the present invention, there is provided a mobile platform system for a vehicle compartment, comprising a platform comprising a front edge, a rear edge and opposite lateral edges, said platform comprising a reinforcement beam along a length thereof on each lateral edge; and a motion assembly, wherein the reinforcement beams engage wheels on each lateral edge of the platform; the motion unit driving said platform supported by the wheels in and out of the vehicle compartment There is further provided a platform and a wheel assembly, wherein said wheel assembly comprises one of: i) at least one supporting plate on each side of the platform, facing lateral edges of the platform, the supporting plate mounting a least a bottom rotating wheel at a first height of the plate and a top rotating wheel at a second height of the plate, the second height being higher that said first height, an interspace between facing rotating circumferential surfaces of the wheels engaging a respective lateral edge of said platform; a rotation axis of the wheels being mounted on the plate with a controlled positional tolerance; and ii)at least one wheel mounted on lateral edges of the platform, a rotation axis of the wheels being mounted on said platform with a controlled positional tolerance.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 2 is a rear schematic see-through view of a vehicle showing a platform in a stowed position according to an embodiment of an aspect of the present disclosure;

FIG. 3B is a rear schematic see-through view of a vehicle, showing the platform in a deployed position thereof on a second side of the vehicle according to an embodiment of an aspect of the present disclosure;

FIG. 4B is a bottom schematic view of a platform in a stowed position thereof according to an embodiment of an aspect of the disclosure;

FIG. 4C is a top view of a platform in the deployed position of FIG. 2;

FIG. 5 is a schematic elevation view of a platform in the stowed position of FIG. 2;

FIG. 6 is a schematic view of a guiding plate according to an embodiment of an aspect of the present disclosure;

FIG. 9B is a top view of the plate of FIG. 9A;

FIG. 9C is a front view of the plate of FIG. 9A.

FIG. 10A shows a elevation view of a detail of motion unit of a platform in a manual mode according to an embodiment of an aspect of the disclosure;

FIG. 10B shows a top perspective view of the motion unit in a motorized mode;

FIG. 10C is a detail of FIG. 10B;

FIG. 10D is a top view of the motion unit of FIG. 10B;

FIG. 10E is a detail of FIG. 10D;

FIG. 13 is a section view of the platform of FIG. 11 from the rear of the vehicle, in a stowed position thereof;

FIG. 14 is a side view of the platform of FIG. 11 from the rear of the vehicle, in a deployed position thereof.

DESCRIPTION OF ILLUSTRATIVE EMBODIMENTS

The present invention is illustrated in further details by the following non-limiting examples.

In a nutshell, there is described a platform that may be motorized or manually made to move in and out of a compartment of a vehicle, for the purpose of loading and unloading of items therefrom for example.

FIG. 2 shows a platform 1 in a stowed position thereof within a baggage compartment 2 of a vehicle 25. The platform 1 is fully retracted within the baggage compartment 2, generally parallel to the floor 3 of the vehicle baggage compartment 2.

Figure 1:
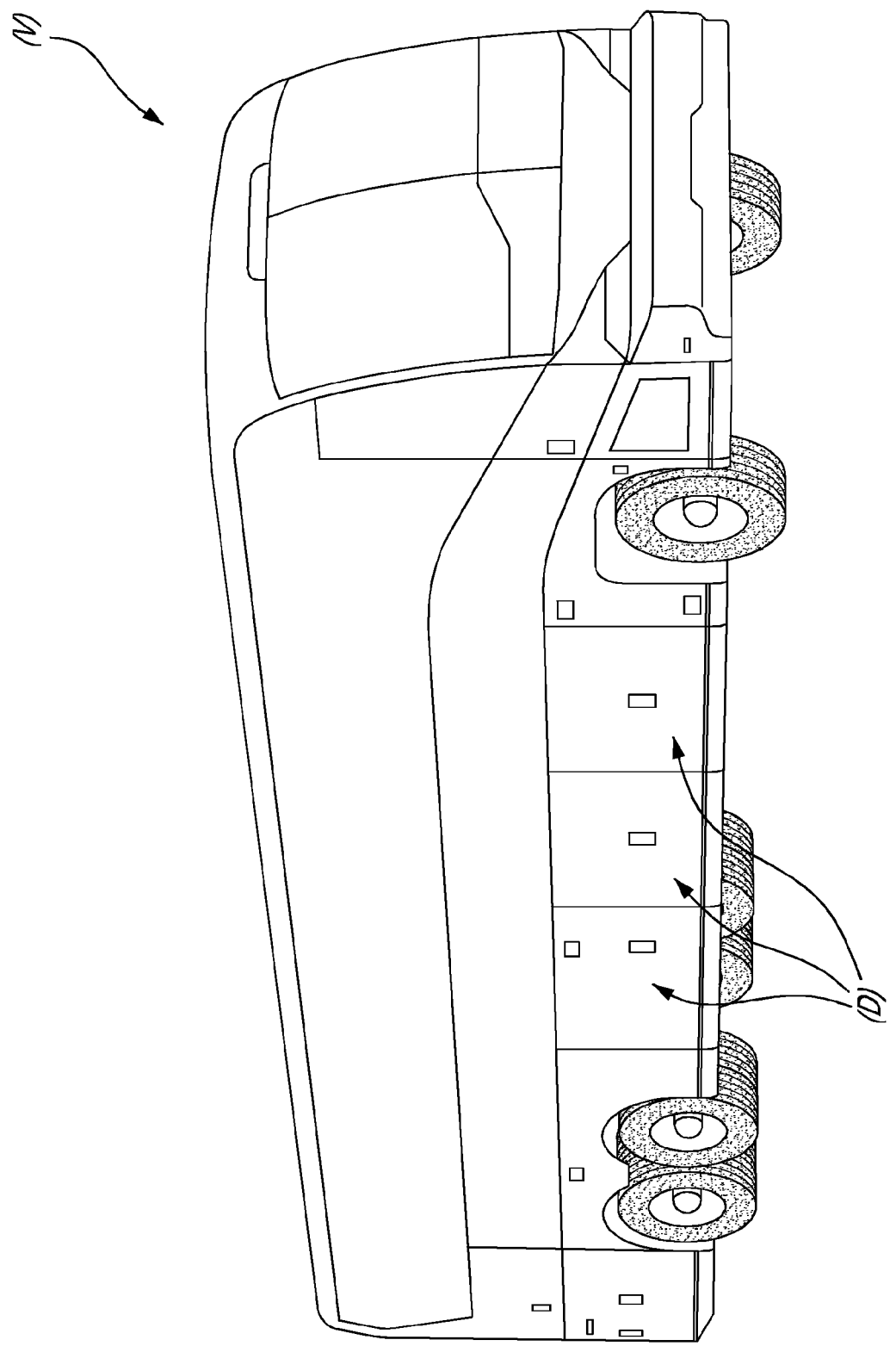
FIG. 1 is a schematic view of a passenger bus as known in the art.
Figure 3A:
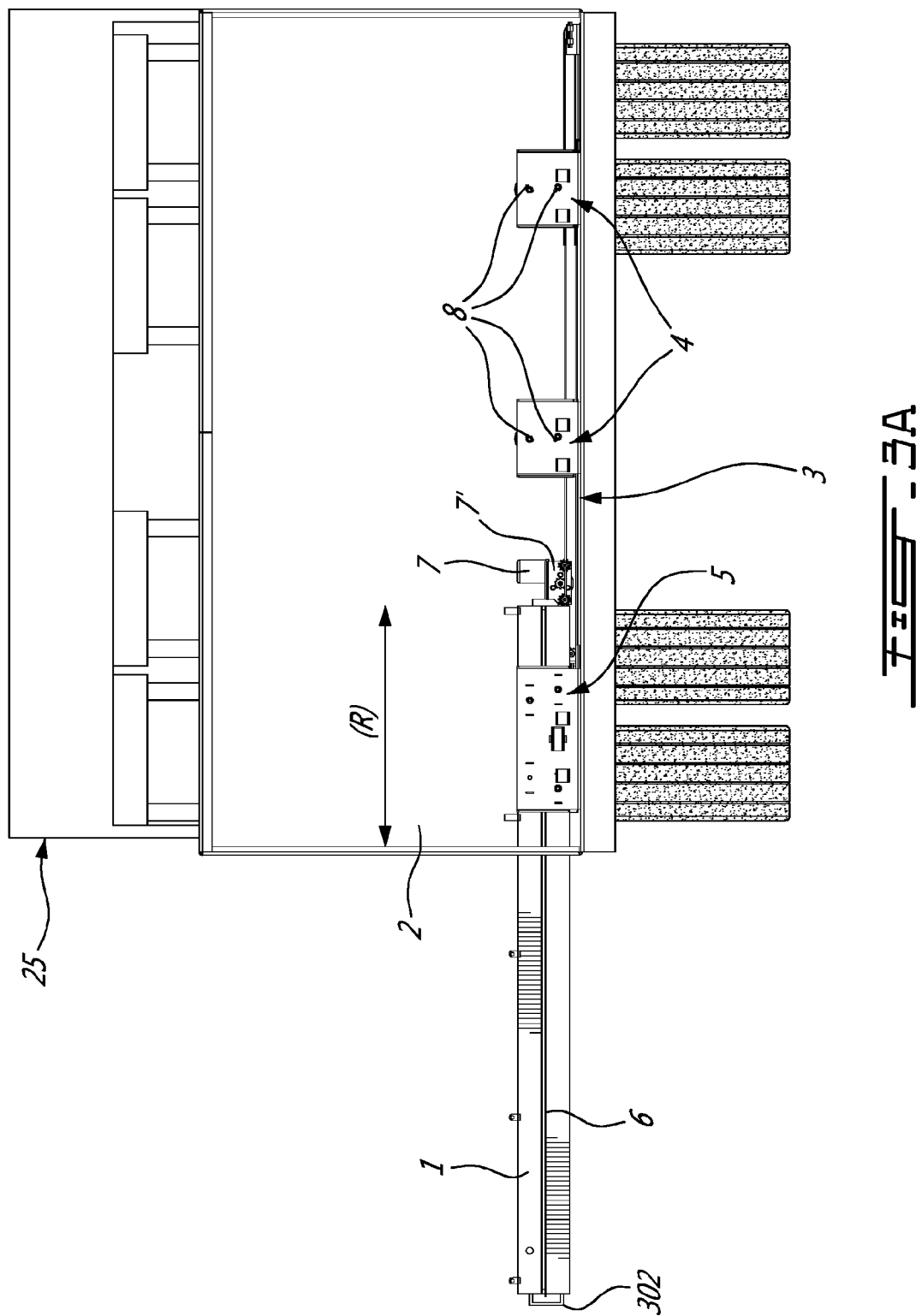
FIG. 3A is a rear schematic see-through view of a vehicle, showing the platform in a deployed position thereof on a first side of the vehicle according to an embodiment of an aspect of the present disclosure.

FIG. 3 show the platform 1 in a fully deployed position thereof, in which the platform 1 extends out from the baggage compartment 2 through an open door of the baggage compartment 2 on a side of the vehicle 25 (left hand-side in FIG. 3A and right-hand side in FIG. 3B), thereby allowing users standing on the respective side of the vehicle 25 spotting and retrieving items therefrom for example.

The platform is generally rectangular or square in shape, of a size fitting within the compartment 2, with a front edge facing the opening of the compartment 2, a rear edge and opposite lateral edges, the lateral edges facing the front and the back of the vehicle 25 respectively, i.e. along the direction of movement of the platform.

Figure 4A:
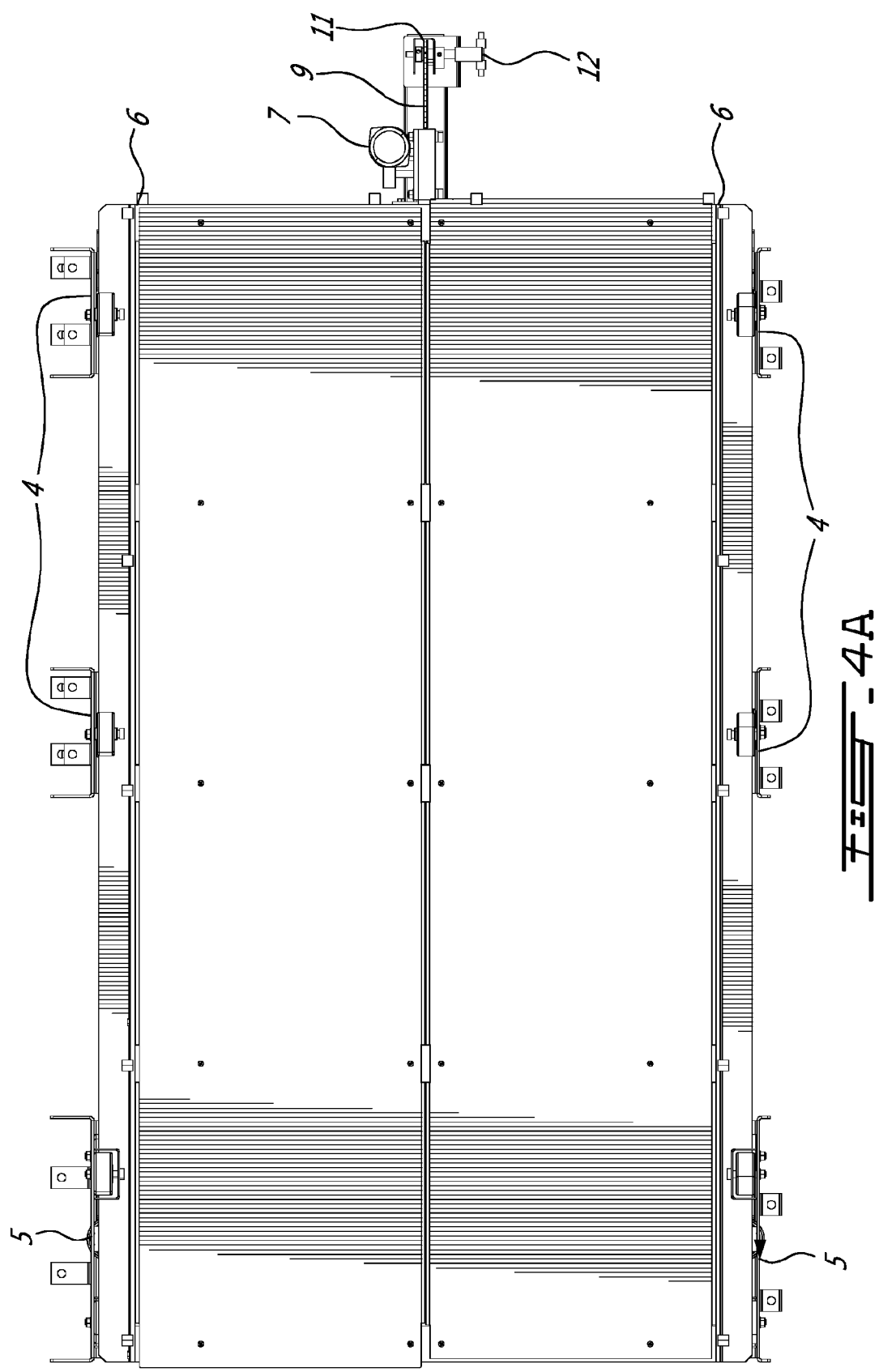
FIG. 4A is a top schematic view of a platform in a stowed position thereof according to an embodiment of an aspect of the present disclosure.

The top surface of the platform 1 as shown in FIGS. 4A, 4C and 5 for instance provides a surface for receiving pieces of articles. The bottom surface of the platform 1, as shown in FIG. 4B for example, comprises transverse reinforcements 100.

As illustrated in FIGS. 4 and 5, each lateral edge comprises a reinforcement T-beam 6 along a length thereof. The flat top 6' of the flange of the T-beam 6 is vertically positioned and secured to the lateral edge of the platform 1, while the web 6" of the T extends generally horizontally away from the respective lateral edge of the platform 1 (see FIG. 5).

In an embodiment illustrated in FIGS. 2-8, supporting plates are secured vertically to the floor 3 of the compartment 2, on each side of the platform, facing the lateral edges of the platform 1, as best seen in FIGS. 4 and 5.

Positioning plates 4 support at least a lower rotating wheel 15 positioned at a height (h) from the floor of the compartment 2' and an upper rotating wheel 15, positioned higher on the plate 4, either aligned with the lower wheel 15 (see FIGS. 6-8) or offset therefrom.

The web 6" of the T beam 6 extending on each lateral edge of the platform 1 is received between the wheels 15, 15' of successive positioning plates 4 along the side of the platform on the floor of the baggage compartment 2 as shown in FIG. 5 for example, thus supporting the platform 1 on each side thereof when the platform 1 is stored within the baggage compartment 2, as well as during its translation out from the stored position (see Arrow A in FIG. 5) thereof, or in from the deployed position.

Figure 8:
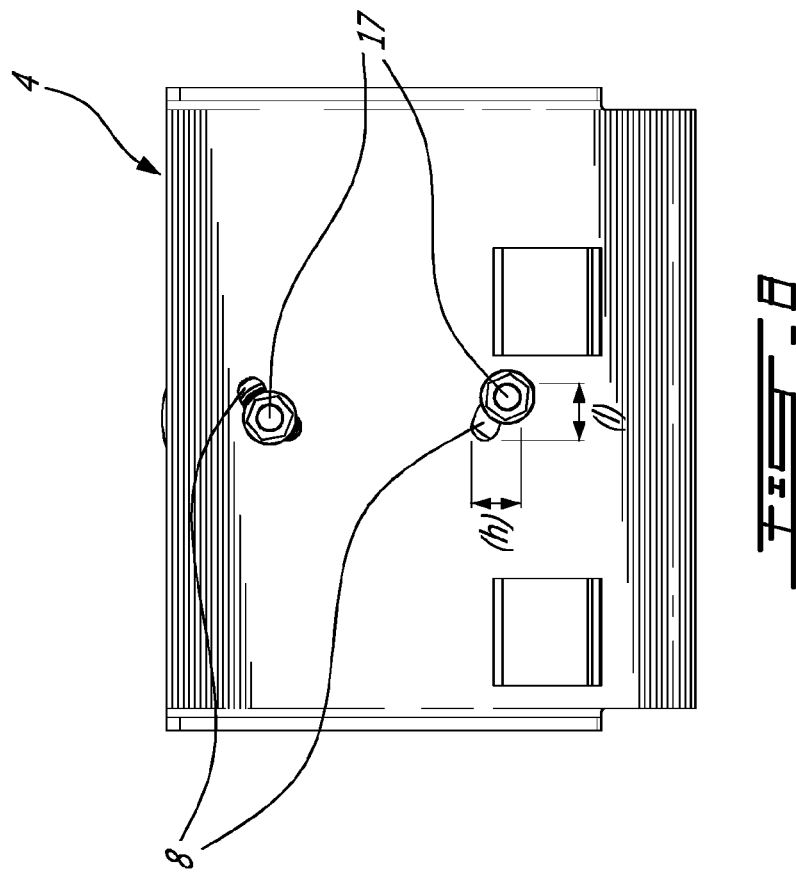
FIG. 8 is a back view of the plate of FIG. 6.

Each wheel 15, 15' of a positioning plate 4 is connected in rotation to the plate 4 by a bolt 16 and nut 17 assembly for example, through a bean-shaped opening 8 within the plate 4, as illustrated in FIG. 8, allowing for controlled vertical (see (h) in FIGS. 6 and 8) and horizontal (see (l) in FIG. 8) tolerance of a position of each wheel, thereby accommodating variation of the floor 3.

Figure 7A:
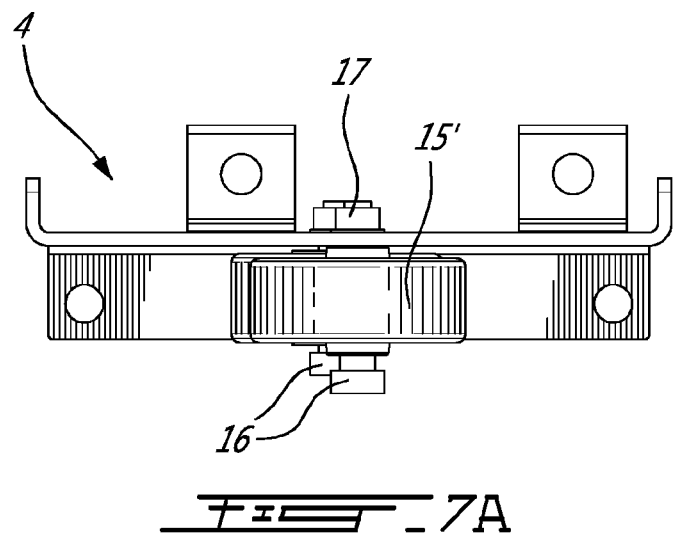
FIG. 7A is a top view of the plate of FIG. 6.
Figure 7B:
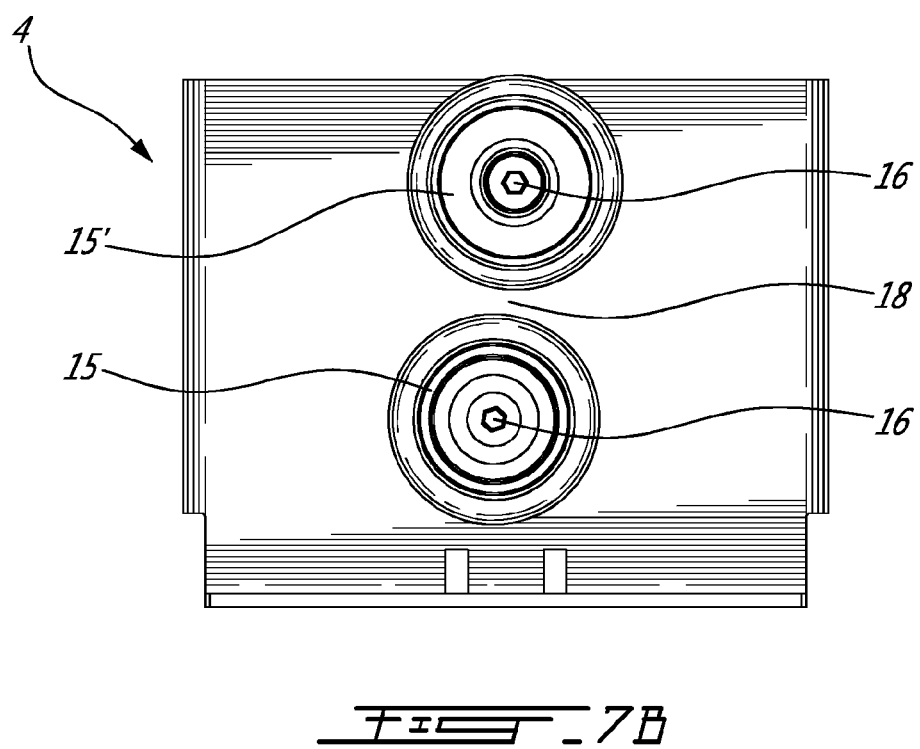
FIG. 7B is a front view of the plate of FIG. 6.
Figure 7C:
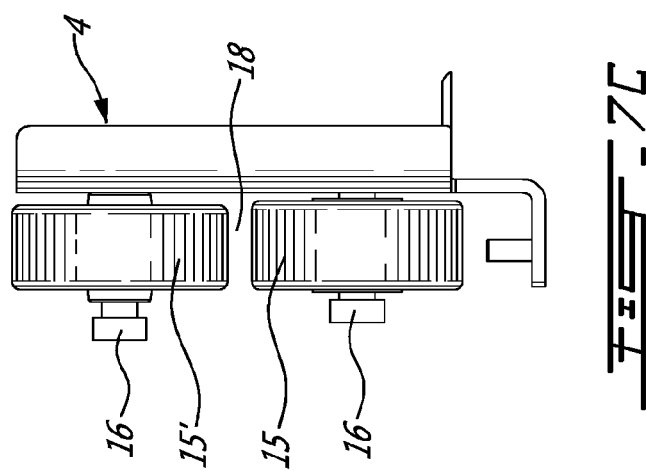
FIG. 7C is a side view of the plate of FIG. 6.

FIG. 7A shows a top view of a plate 4 and the wheels 15, 15' that attach to the plate 4 with the bolts 16 and nuts 17. FIG. 7B shows a front view of the plate 4, with the relative vertical position of the wheels 15, 15' providing a space 18 in between them for the web 6" of the T-beam 6 to engage therebetween. The side view of FIG. 7C shows the relative vertical position of the wheels 15, 15', in such way that the web 6" of the T-beam 6 engages and is guided therebetween. The two wheels may be vertically aligned or offset relative to the vertical direction for that purpose.

As may be understood from the figures, the bean-shape apertures 8 enable adjusting the height of the wheels 15, 15', for matching the position of the platform 1 with that of the underlying floor when the platform 1 is in motion, to prevent blockage of the platform 1 during movement of the platform 1 due to the floor 3 being uneven. Thus, the platform 1 is controlled to move parallel to the floor 3 in and out of the baggage compartment 2 on the side of the vehicle 25, and back in, without jamming, the wheel configuration accommodating variations of the floor 3 if any.

Alternatively, the top and bottom wheels 15, 15' may be positioned on separate adjacent plates 4 instead of on one single plate 4.

Still alternatively, each positioning plate 4 may comprise only rotating wheels at the height (h) from the floor 3, positioned so that the top flat surface thereof supports the bottom flat surface of the web of the T beam, their circumferential surface in contact the outer surface of the lower flange of the T beam.

FIGS. 3, 4 and 5 show master plates 5 positioned on each side of the baggage compartment 2 near the opening side of the baggage compartment 2.

Figure 9A:
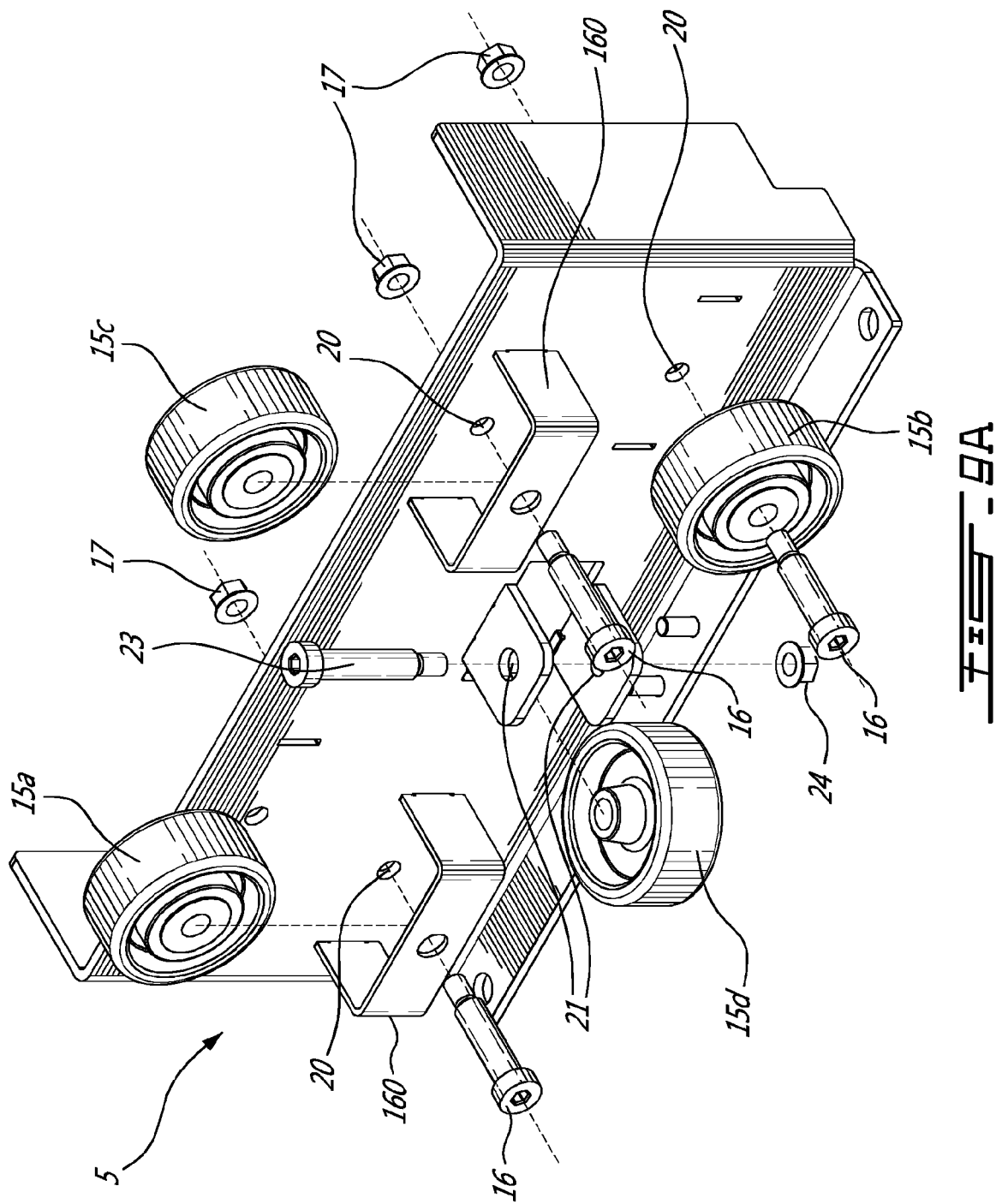
FIG. 9A is a perspective view of a supporting plate according to an embodiment of an aspect of the present disclosure.

The master plate 5 illustrated in FIGS. 9 comprises top wheel 15c and bottom wheels 15a, 15b guiding the web 6" of the T beam therebetween as described hereinabove for example, and a support wheel 15d. The support wheel 15d is positioned so that the top flat surface thereof supports the bottom flat surface of the web of the T beam, its rotating surface in contact the outer surface of the lower flange of the T beam, for additional support of the platform 1 when in motion in and out of the baggage compartment, in particular when in the deployed position. Top and bottom guiding wheels 15c and 15a are offset along the direction of movement of the platform, i.e. diagonally positioned on the plate 5 as best seen in FIGS. 9A and 9C, to maintain the platform 1 in a generally horizontal plane, thereby retaining the platform 1 that may tend to tilt up at the rear part thereof remaining within the baggage compartment when in a deployed position. Reinforcing braces 160 are shown, anchoring the axis of these wheels 15a and 15c that are submitted to this rearwardly uplifting force of the platform when the platform extends out of the baggage compartment.

Such combination of wheels allows controlling the motion of the platform 1 for a smooth and secure transition from the stowed position (FIGS. 2, 4A) to the deployed position (FIGS. 3, 4C) and vice-versa, and for support when in the deployed position.

As illustrated for example FIGS. 3 and 4C, in a fully deployed position, the platform 1 may be allowed to come out of the baggage compartment 2 only up to a certain percentage of its full length, as controlled, by stops 300 such as electrical switches with end stops for example, provided on the sides of the platform for example, along the direction of motion of the platform in the baggage compartment for example (shown seen in FIG. 2), part (R) of its length remaining within the baggage compartment 2 for support by the master plates 5 as described hereinabove.

A supporting foot (not shown) may also be provided underneath the part of the platform 1 extending out of the baggage compartment 2 thereby preventing the platform 1 from falling out of the baggage compartment 2 and/or from collapsing under the load of items supported thereon for example. The height of such supporting foot may be selected for contact with the ground for efficient support. The supporting foot may be foldable and/or removable in the stored position of the platform 1.

FIG. 5 show guard rails 200, which may be foldable and/or removable, supported by the T beams 6, provided on each lateral edge of the platform for preventing the pieces of items falling out from the platform during movements of the platform for example. Such guard rails may be provided on the rear and front edges of the platform.

A motion unit will now be described in relation to with FIGS. 2-5.

A front sprocket 14 is mounted on the floor of the compartment near the opening of the compartment (see FIG. 4B), a rear sprocket 10, 11 is mounted on the floor of the compartment at the opposite side of the compartment, and a chain 9 is supported between the front and rear sprockets, underneath the platform. The front sprocket may comprise a chain tensioner (not shown).

A motor 7 is attached to the platform, for example on a plate 7' at the rear edge of the platform 1 as illustrated FIGS. 2 and 4C, in such a way as to mount the upper run of the chain 9 supported between the front and rear sprockets underneath the platform (see FIG. 4C).

A clutch 12, shown in FIGS. 10B-10E connected to the rear sprocket 11 through a shaft 13, allows switching from a manual mode (FIG. 10A) of motion to a motorized mode (FIGS. 10B-10E) of motion and vice-versa.

In the motorized mode, the sprocket 10, 11 is disengaged, and pins 13' that lock the chain 9 stationary are engaged, so that the chain 9 is stationary about the sprockets. Motion of the platform is driven by the motor 7 moving along the upper run of the stationary chain 9 beneath the platform, thereby pushing or pulling the platform in and/or of the compartment 2.

The motorized motion in and out of the platform 1 may be switched to the manual mode by action of the clutch 12 disengaging the sprocket 10,11 and the pins 13'. The chain 9 is then allowed to rotate about the sprockets and an operator may move the platform by action on the chain 9 for example (FIG. 10A).

In FIGS. 3 and 4B a bumper 302 is shown, mounted on the front edge of the platform using springs for example. The bumper 302 may incorporate a number of sensors such as optical sensors or impact sensors for example, in such a way as to detect any obstacle on the way of the platform out of the vehicle. In case an obstacle is detected, the motion of the platform may be stopped. Similarly, sensors may be position on the rear edge of the platform.

As a person of skill in the art will now be in a position to appreciate, there is thus provided a platform, and a supporting assembly therefor, providing a platform that is mobile on the floor of a compartment of a vehicle such as a coach or a recreational vehicle, amongst other examples. The supporting assembly comprises wheels, to support the weight of the platform as well as of multiple items such as bags, suitcases, packages and other articles of various size and weight that may be placed thereon. The platform with the load thereon is activated to move in and out of the baggage compartment for the purpose of access to its content, thus facilitating the loading and unloading process of the carried items. The supporting assembly comprises may comprise support plates attached to the structure of the baggage compartment, which may be, depending on the vehicle configuration and structure, the floor, the bottom of the compartment, or structural pillars inside the compartment for example.

The platform may thus deploy parallel to the baggage compartment floor without any substantial torsion of the platform, by a combination providing guidance of the platform at a center thereof (see motor 7/chain 9 assembly positioned on the center line of the platform 1 between the lateral edges of the platform in FIGS. 4 and 5 for instance) and an adjustable position relative to the floor level during motion as guided by adjustable wheels.

The platform deployment may be motorized or manually driven.

In an embodiment illustrated herein, a motion unit comprising a chain connected to the platform and a motor moving on that chain is used to move the platform in and out of the vehicle compartment on the motorized mode, the motor, with the chain going through the motor plate, pulls or pushes the platform. The motorized mode may be disengaged, enabling a manual deployment mode. The motion unit may be stopped by action on a control button (not shown) located on or within the vehicle or with a remote control, Alternatively, using a pulley and belt assembly instead of a chain and sprocket assembly as described hereinabove, or an endless screw or gear rack and gear combination for example may be contemplated. Still alternatively, an hydraulic actuator, a cable arrangement, an electric actuator, or a scissor actuator 9' (see FIG. 15 discussed hereinbelow for example) may be used.

Either automatically or manually activated, the platform may be controlled to come out of the baggage compartment only up to a certain percentage of its full length, therefore preventing the platform from tilting out of the vehicle and collapsing on the ground.

In another embodiment illustrated in FIGS. 11-15, wheels 504, 506 are mounted to the platform 500, aligned along the direction of movement of the platform, the wheels in contact with the floor 3 of the baggage compartment (see FIGS. 11, 12), the thus wheeled platform 500 being movable in and out of the baggage compartment, from a lateral side of the vehicle through the door (L) of the baggage compartment 2 on the opposite lateral side (see FIG. 14).

Figure 15:
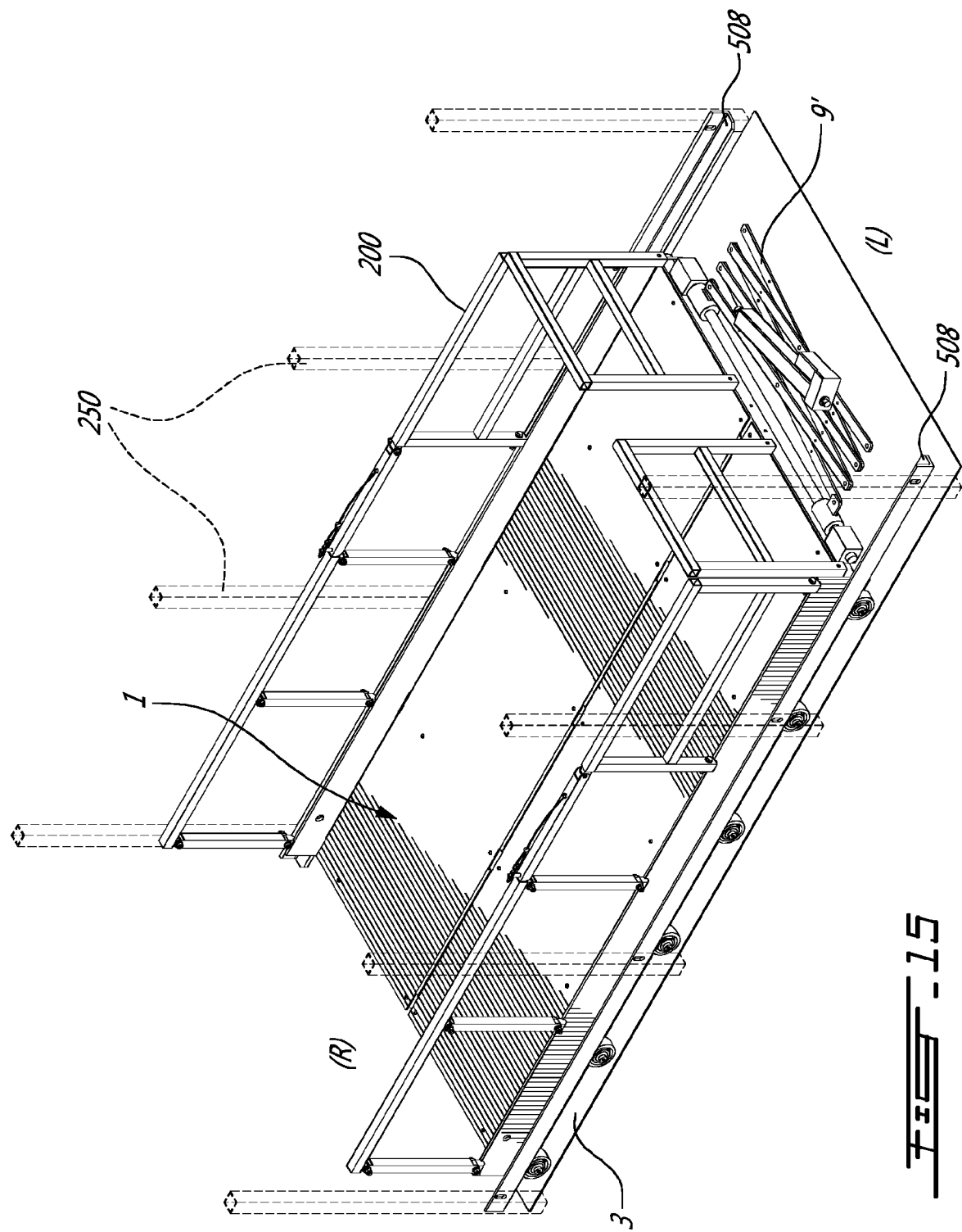
FIG. 15 shows a motion unit for the platform of FIG. 11 according to an embodiment of an aspect of the present disclosure.

FIG. 15 shows a motion unit in which the chain and sprocket assembly as described hereinabove is replaced by a scissor actuator 9'. A lever may be used to disengage the actuator from the scissor arm, thereby allowing a manual deployment/retraction of the scissor arm and a manual motion mode of the platform.

Figure 11:
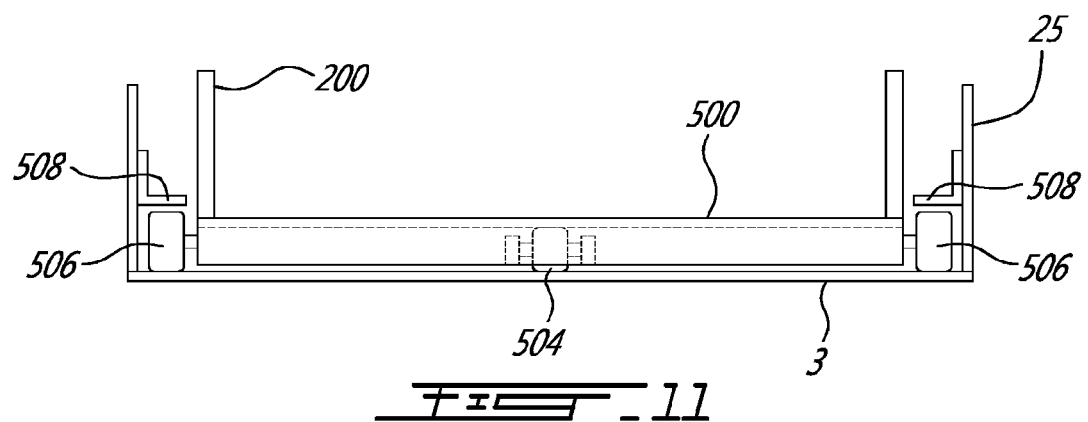
FIG. 11 is a schematic section view of a platform, transversally relative to a longitudinal direction of the vehicle, according to an embodiment of an aspect of the present disclosure.
Figure 12:
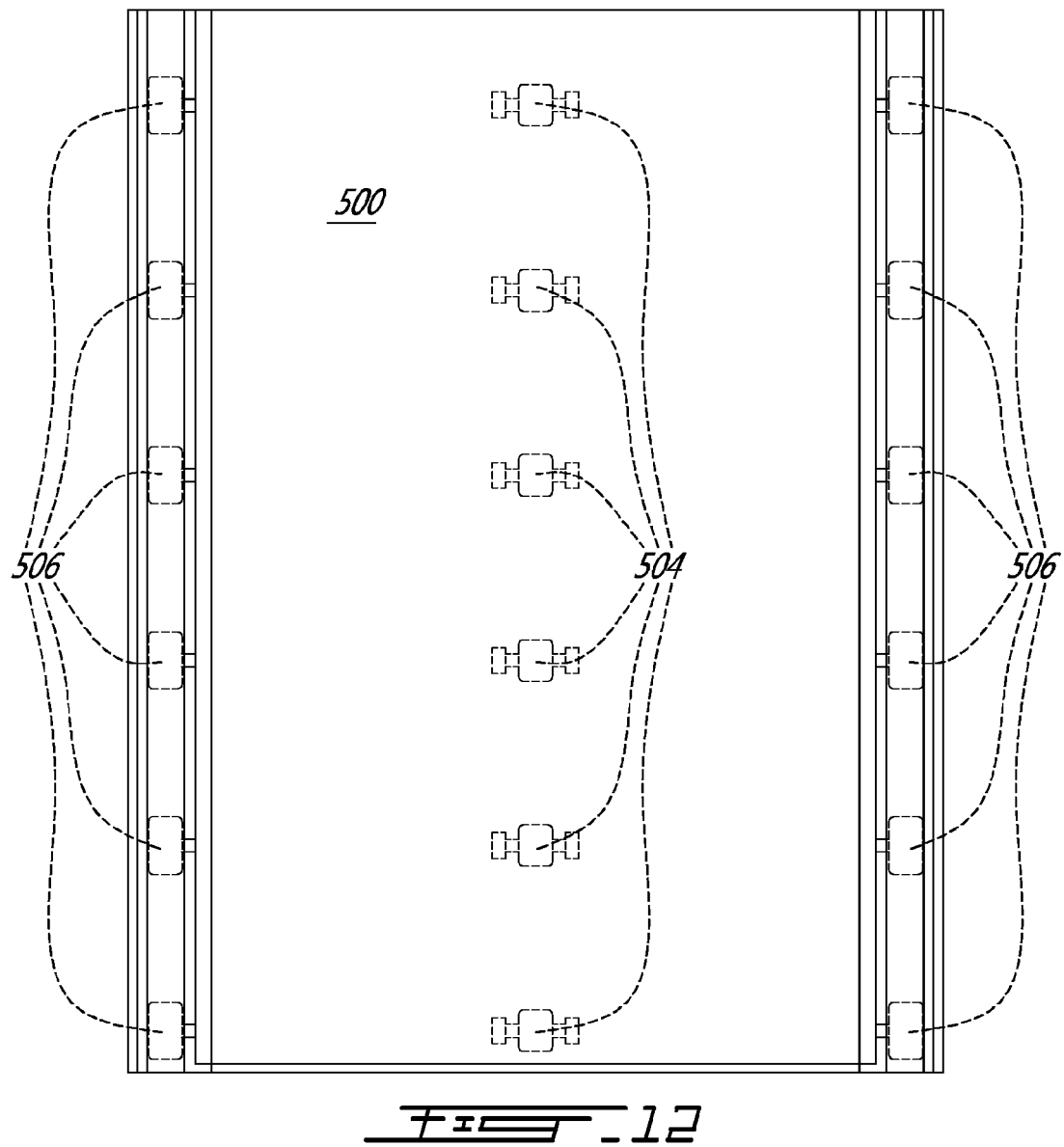
FIG. 12 is a top view of the platform of FIG. 11.

Stoppers, such as L-shape stoppers 506, 508 shown in FIGS. 11, 13 and 14, may be mounted on side walls or side poles (see 250 in FIG. 15) of the baggage compartment on each lateral side of the platform 500, at an adjustable height from the floor 3 as illustrated for example in FIG. 11, so as to prevent tilting up of the platform at the rear edge thereof remaining within the baggage compartment when the platform is in a deployed position, as discussed hereinabove in relation to diagonally positioned wheels 15*a* and 15*c* of the embodiment of FIGS. 9 for example.

As schematically illustrated for example in FIGS. 13 and 14, articulated guiding tails, such as wheeled tails 516 may be provided at the rear edge of the platform 500 (on the side of door (L) in FIGS. 13 and 14), as extensions of the platform unfolding from a stored position, up against a back wall or door (L) of the compartment in FIGS. 13 and 14, when the platform 500 is in its stowed position within the baggage compartment 2 (see FIG. 13), to a deployed position within the baggage compartment 2 when the platform 500 moves out to its deployed position out of the baggage compartment 2. Even in a fully deployed position of the platform 500, the articulated wheeled tails 516 remain within the baggage compartment 2, typically lying on the floor 3 thereof, counterbalancing at least part of the weight of the platform hanging out of the baggage compartment 2 above the sidewalk on the lateral side of the vehicle.

Guard rails 200, which may be foldable and/or removable, standing up from the T beams (discussed hereinabove in relation to the embodiment illustrated in FIGS. 4 and 5 for example) of the platform 500, may be provided for preventing the pieces of items falling out from the platform during movements of the platform for example.

There is thus provided a system comprising a platform, wheels supporting the platform both at rest and in motion, and a motion unit that enables motorized or manual deployment of the platform. The platform may be deployed on a lateral side of the vehicle, parallel to the floor of the baggage compartment. When deployed, the platform overhangs out of the vehicle on the lateral side of the vehicle.

Plates mounted to the structure of the baggage compartment may support the wheels. The front and rear edges of the platform, generally in a direction transverse to the longitudinal axis of the vehicle, each comprises T-beam running along at least a length thereof, with the web of each T-beam positioned to engage between wheels of the plates for example. Mounting of the wheels on the plates allows adjustable relative positions of the wheels as the platform moves on the floor, in such a way as to prevent jaming of the platform motion, both in motorized and manual modes.

The motion unit may be fixed to the floor of the baggage compartment. A chain moving when a sprocket is engaged may be used. Motion may be motorized or activated manually. In the case of an electrical or motor failure, a clutch may be used to free the chain, allowing a manual mode.

The scope of the claims should not be limited by the embodiments set forth in the examples, but should be given the broadest interpretation consistent with the description as a whole.

The invention claimed is:

1. A mobile platform system for a vehicle compartment, comprising:
   a platform comprising a front edge, a rear edge and opposite lateral edges, said platform comprising a reinforcement beam along a length thereof on each lateral edge; and
   a motion assembly;
   wherein the reinforcement beams is configured to engage wheels on each lateral edge of the platform;
   wherein said motion assembly comprises one of:
   i) at least one supporting plate on each side of the platform, facing lateral edges of the platform, the supporting plate mounting a least a bottom rotating wheel at a first height of the plate and a top rotating wheel at a second height of the plate, said second height being higher that said first height, an interspace between facing rotating circumferential surfaces of said wheels engaging a respective lateral edge of said platform; a rotation axis of said wheels being mounted on said plate with a controlled positional tolerance; and
   at least one wheel mounted on lateral edges of the platform, a rotation axis of said wheels being mounted on said platform with a controlled positional tolerance;
   said motion assembly driving said platform supported by said wheels in and out of the vehicle compartment.

2. The mobile platform system of claim 1, wherein each lateral edge comprises a T-beam along a length thereof, a flat top of the flange of the T-beam being vertically positioned and secured to the respective lateral edge of the platform, while the web of the T-beam extends generally horizontally away from the respective lateral edge of the platform, said webs engaging the wheels on each lateral edge of the platform.

3. The mobile platform system of claim 1, wherein:
   each lateral edge comprises a T-beam along a length thereof, a flat top of the flange of the T-beam being vertically positioned and secured to the respective lateral edge of the platform, and the web of the T-beam extending generally horizontally away from the respective lateral edge of the platform;
   the platform system comprises supporting plates secured to the floor of the compartment, on each side of the platform, facing the lateral edges of the platform, said wheels being mounted to said supporting plates with an adjustable vertical and horizontal position of each wheel; and
   the web of the T-beam is supported by said wheels.

4. The mobile platform system of claim 1, wherein the wheels are supported in relative to the floor of the vehicle compartment on each lateral edge of the platform by supporting plates, with a controlled vertical and horizontal tolerance of a position of each wheel.

5. The mobile platform system of claim 1, wherein:
   each lateral edge comprises a T-beam along a length thereof, a flat top of the flange of the T-beam being vertically positioned and secured to the respective lateral edge of the platform, and the web of the T-beam extending generally horizontally away from the respective lateral edge of the platform;
   the platform system comprises supporting plates secured to the floor of the compartment, on each side of the platform, facing the lateral edges of the platform;
   said wheels are mounted to said supporting plates with an adjustable position of each wheel; and
   the web of each T-beam is supported by a top flat surface of the wheels, a lower flange of the T-beam being in contact with a circumferential surface of the wheels.

6. The mobile platform system of claim 1, wherein:
   each lateral edge comprises a T-beam along a length thereof, the web of each T-beam being guided between upper and lower wheels supported relative to the floor of the vehicle compartment on each said lateral edges of the platform.

7. The mobile platform system of claim 1, wherein:
   each lateral edge comprises a T-beam along a length thereof, the web of each T-beam is guided between upper and lower guiding wheels supported relative to a floor of the compartment on each said lateral edges of the platform, at least one supporting wheel on each said lateral edges of the platform supporting the platform.

8. The mobile platform system of claim 1, wherein:
   each lateral edge comprises a T-beam along a length thereof, the web of each T-beam is guided between upper and lower guiding wheels supported relative to the floor of the vehicle compartment on each said lateral edges of the platform, said upper and lower guiding wheels being offset along a direction of movement of the platform.

9. The mobile platform system of claim 1, wherein said wheels are mounted to said platform.

10. A mobile platform system for a vehicle compartment, comprising:
a platform comprising a front edge, a rear edge and opposite lateral edges, said platform comprising a reinforcement beam along a length thereof on each lateral edge; and
a motion assembly;
wherein the reinforcement beams engage wheels on each lateral edge of the platform; said motion unit driving said platform supported by said wheels in and out of the vehicle compartment;
said motion assembly comprising:
a front sprocket mounted on the floor of the compartment on an opening side of the compartment and a rear sprocket mounted on the floor of the compartment on an opposite side of the compartment at the rear edge of the platform;
a chain supported between said front sprocket and said rear sprocket;
a motor attached to said platform and mounted to the chain; and
a clutch;
wherein said clutch is configured to lock a rotation of the chain about the sprockets for a motorized motion mode; and to unlock the rotation of the chain for a manual motion mode;
wherein, in said motorized motion mode, the motor moves the platform by moving along the chain;
wherein, in said manual mode, the platform is moved by rotation of the chain about the sprockets.

11. A mobile platform system for a vehicle compartment, comprising:
a platform comprising a front edge, a rear edge and opposite lateral edges, said platform comprising a reinforcement beam along a length thereof on each lateral edge; and
a motion assembly;
wherein the reinforcement beams engage wheels on each lateral edge of the platform; said motion unit driving said platform supported by said wheels in and out of the vehicle compartment;
wherein said motion assembly comprises a chain connected to the platform and a motor attached to said platform, said chain being supported between a front sprocket mounted on the floor of the compartment on an opening side of the compartment and a rear sprocket mounted on the floor of the compartment on an opposite side of the compartment at the rear edge of the platform; wherein said chain is configured to be one of:
stationary, said motor moving along said stationary chain; and
rotating about the front sprocket and the rear sprocket, for moving the platform.

12. A mobile platform system for a vehicle compartment, comprising:
a platform comprising a front edge, a rear edge and opposite lateral edges, said platform comprising a reinforcement beam along a length thereof on each lateral edge; and
a motion assembly;
wherein the reinforcement beams engage wheels on each lateral edge of the platform; said motion unit driving said platform supported by said wheels in and out of the vehicle compartment; and wherein said motion assembly comprises a pulley and belt assembly.

13. A mobile platform system for a vehicle compartment, comprising:
a platform comprising a front edge, a rear edge and opposite lateral edges, said platform comprising a reinforcement beam along a length thereof on each lateral edge; and
a motion assembly;
wherein the reinforcement beams engage wheels on each lateral edge of the platform; said motion unit driving said platform supported by said wheels in and out of the vehicle compartment; and wherein said motion assembly comprises one of: an endless screw, a gear rack and a gear combination.

14. A mobile platform system for a vehicle compartment, comprising:
a platform comprising a front edge, a rear edge and opposite lateral edges, said platform comprising a reinforcement beam along a length thereof on each lateral edge; and
a motion assembly;
wherein the reinforcement beams engage wheels on each lateral edge of the platform; said motion unit driving said platform supported by said wheels in and out of the vehicle compartment; and wherein said motion assembly comprises one of: an hydraulic actuator, an electric actuator, and a scissor actuator.

15. A mobile platform system for a vehicle compartment, comprising:
a platform comprising a front edge, a rear edge and opposite lateral edges, said platform comprising a reinforcement beam along a length thereof on each lateral edge; and
a motion assembly;
wherein the reinforcement beams engage wheels on each lateral edge of the platform; said motion unit driving said platform supported by said wheels in and out of the vehicle compartment; and wherein:
each lateral edge comprises a T-beam along a length thereof; and the wheels are mounted on said T-beams.

16. A mobile platform system for a vehicle compartment, comprising:
a platform comprising a front edge, a rear edge and opposite lateral edges, said platform comprising a reinforcement beam along a length thereof on each lateral edge; and
a motion assembly;
wherein the reinforcement beams engage wheels on each lateral edge of the platform; said motion unit driving said platform supported by said wheels in and out of the vehicle compartment; and, wherein said platform further comprises at least one articulated tail at the rear edge of the platform, said articulated tail unfolding from a stored position when the platform is in a stowed position thereof within the compartment, to a deployed position within the compartment when the platform moves to a deployed position out of the compartment.

17. A mobile platform system for a vehicle compartment, comprising:
a platform comprising a front edge, a rear edge and opposite lateral edges, said platform comprising a reinforcement beam along a length thereof on each lateral edge; and
a motion assembly;

wherein the reinforcement beams engage wheels on each lateral edge of the platform; said motion unit driving said platform supported by said wheels in and out of the vehicle compartment; and wherein said motion unit comprises a scissor actuator.

18. A platform and a wheel assembly, wherein said wheel assembly comprises one of:
  ii) at least one supporting plate on each side of the platform, facing lateral edges of the platform, the supporting plate mounting a least a bottom rotating wheel at a first height of the plate and a top rotating wheel at a second height of the plate, said second height being higher that said first height, an interspace between facing rotating circumferential surfaces of said wheels engaging a respective lateral edge of said platform; a rotation axis of said wheels being mounted on said plate with a controlled positional tolerance; and
  iii) at least one wheel mounted on lateral edges of the platform, a rotation axis of said wheels being mounted on said platform with a controlled positional tolerance.

19. The assembly of claim 18, further comprising a motion unit, said motion unit comprising:
  a front sprocket mounted on the floor of the compartment on an opening side of the compartment and a rear sprocket mounted on the floor of the compartment on an opposite side of the compartment at the rear edge of the platform;
  a chain supported between said front sprocket and said rear sprocket;
  a motor attached to said platform and mounted to the chain; and
  a clutch;
  wherein said clutch is configured to lock a rotation of the chain about the sprockets for a motorized motion mode; and to unlock the rotation of the chain for a manual motion mode;
  wherein, in said motorized motion mode, the motor moves the platform by moving along the chain; and
  wherein, in said manual mode, the platform is moved by rotation of the chain about the sprockets.

20. The assembly of claim 18, wherein said assembly further comprises a motion assembly; said platform comprises a reinforcement beam along a length thereof on each lateral edge; and said reinforcement beams engage one of:
  i) said at least one bottom wheel and said at least one top wheel; and
  ii) said at least one wheel;
  respectively.

* * * * *